(12) United States Patent
Berry

(10) Patent No.: US 6,454,311 B1
(45) Date of Patent: Sep. 24, 2002

(54) GAS LINE MOUNTING ASSEMBLY

(75) Inventor: Gary E. Berry, La Follette, TN (US)

(73) Assignee: Lincoln Brass Works, Inc., Hendersonville, TN (US)

( * ) Notice: Subject to any disclaimer, the term of this patent is extended or adjusted under 35 U.S.C. 154(b) by 120 days.

(21) Appl. No.: 09/672,757

(22) Filed: Sep. 28, 2000

(51) Int. Cl.[7] .................................................. F16L 3/08
(52) U.S. Cl. ........................ 285/61; 248/65; 248/74.1; 285/64; 285/331
(58) Field of Search ........................... 285/61, 64, 331; 248/65, 74.1

(56) References Cited

U.S. PATENT DOCUMENTS

| | | | |
|---|---|---|---|
| 1,673,789 A | * 6/1928 | Nolte et al. ................... 248/65 |
| 2,053,262 A | * 9/1936 | Cornell, Jr. ................... 248/65 |
| 3,232,568 A | 2/1966 | Lennon et al. |
| 3,235,209 A | 2/1966 | Seckerson et al. |
| 3,474,810 A | * 10/1969 | Welsh ........................ 285/64 |
| 3,802,654 A | 4/1974 | Jenko et al. |
| 3,920,208 A | 11/1975 | Dowdy et al. |
| 3,998,268 A | 12/1976 | Sagan |
| 4,327,887 A | 5/1982 | Kumakura |
| 4,420,022 A | * 12/1983 | Landry ........................ 285/61 |
| 4,429,497 A | 2/1984 | Dibernardi |
| 4,826,114 A | * 5/1989 | Umehara ................... 248/74.1 |
| 5,020,563 A | * 6/1991 | Hoffman et al. ............... 137/75 |
| 5,022,614 A | 6/1991 | Rinderer |
| 5,024,405 A | 6/1991 | McGuire |
| 5,269,584 A | 12/1993 | Takagi |
| 5,435,512 A | 7/1995 | Rudy, Jr. et al. |
| 5,586,738 A | 12/1996 | Binelli |
| 5,622,341 A | 4/1997 | Stana |
| 5,644,885 A | 7/1997 | Eischeid |
| 5,762,299 A | 6/1998 | Motsch |
| 5,806,812 A | 9/1998 | Jacobs et al. |
| 5,820,168 A | 10/1998 | De Giacomoni |
| 5,823,484 A | 10/1998 | Barnard et al. |
| 5,839,703 A | * 11/1998 | Tesar ........................ 248/74.1 |
| 5,853,157 A | 12/1998 | O'Donnell |
| 5,971,335 A | 10/1999 | Perrin et al. |
| 6,318,765 B1 | * 11/2001 | Slais et al. ................... 285/305 |

* cited by examiner

Primary Examiner—Eric K. Nicholson
(74) Attorney, Agent, or Firm—Harness, Dickey & Pierce, P.L.C.

(57) ABSTRACT

A gas line mounting assembly includes a bracket which is adapted for being secured to a cabinet of an appliance and a gas inlet fitting attached to the bracket. The fitting has a generally rectangular body disposed within a generally rectangular aperture in the bracket. The enlargement between the rectangular body and the rectangular aperture prevent rotation of the fitting with respect to the bracket. The bracket has a tab which is plastically deformed into a groove of the rectangular body to prevent longitudinal movement of the fitting with respect to the bracket.

21 Claims, 2 Drawing Sheets

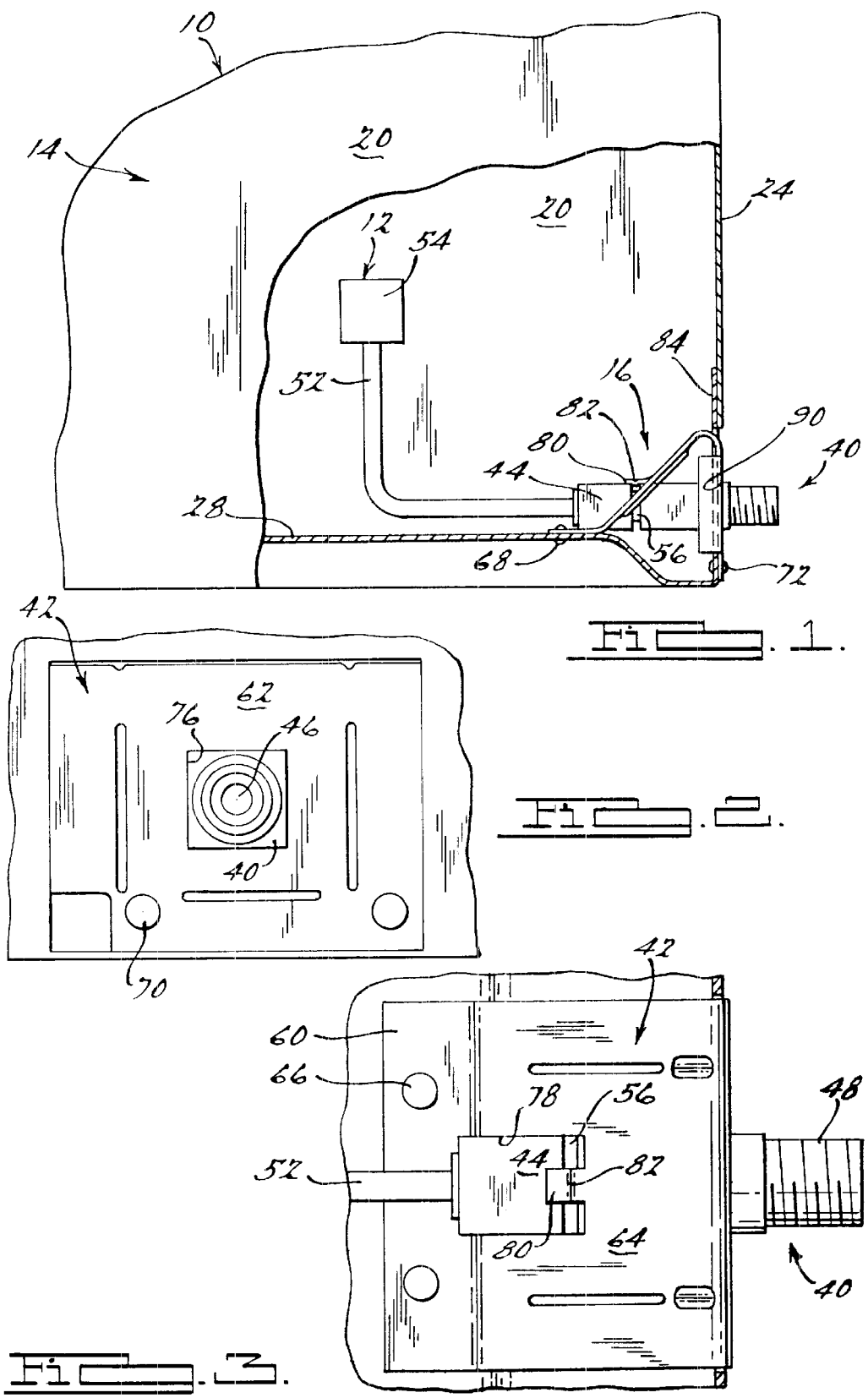

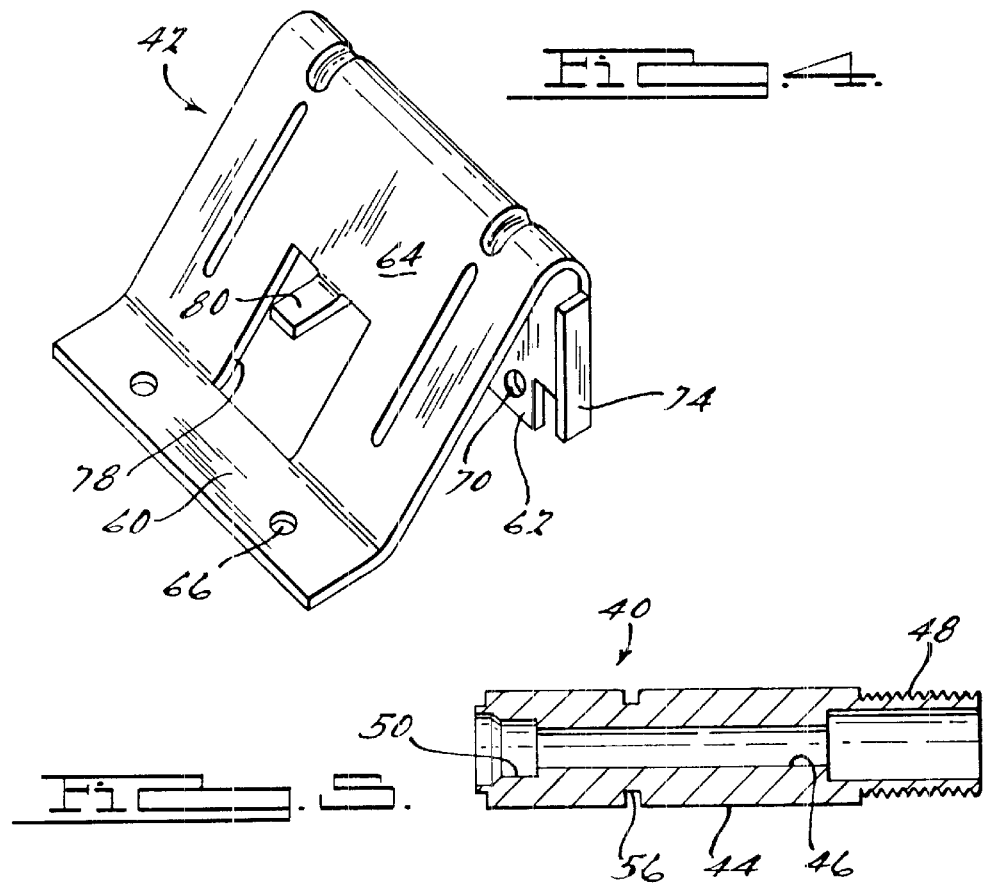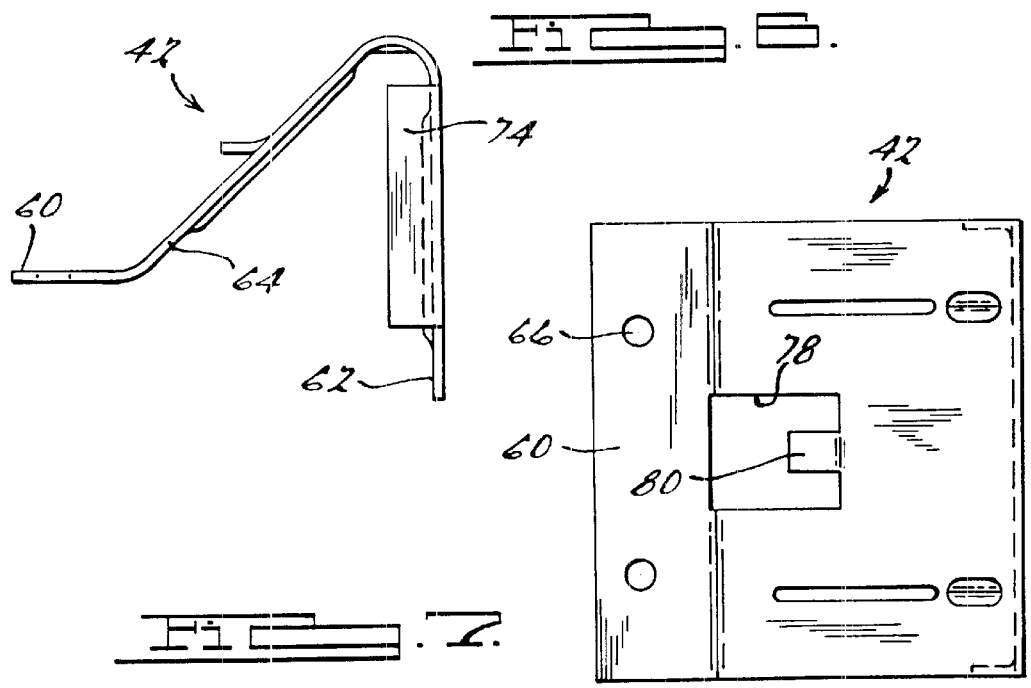

GAS LINE MOUNTING ASSEMBLY

FIELD OF THE INVENTION

The present invention relates to a mounting assembly for a gas line. More particularly, the present invention relates to a mounting assembly for a gas line for use in a home appliance.

BACKGROUND OF THE INVENTION

Major home appliances such as washers, dryers and stoves have become a necessity in modern day living. When choosing a source of energy for these appliances, the choice is between an electrical appliance or a gas appliance. Currently, the cost of energy for gas is significantly lower than that for electricity. This is true if the gas is from a centralized natural gas supply system or if it is from a local LP gas source.

Once the choice of a gas appliance has been made, the installation of the appliance requires connection of the appliance to the source of gas and possibly the connection of the device to a source of electricity to operate any motors such as a dryer motor or other electrical devices such as controls, clocks or electronic devices.

During a typical installation, the appliance is positioned close to its final position. A flexible gas supply tube is connected from the source of gas to the appliance. The appliance is then hard wired to a source of electricity or it is plugged into an electrical outlet. Finally, the appliance is moved into its final position. The final position is typically in line with a set of cabinets if the appliance is an oven and/or adjacent to another appliance such as a washer if the appliance is a dryer.

One of the most critical aspects of the installation of the gas appliance is the need to ensure a leak-free connection for the gas line which extends between the source of gas and the appliance. Typically, the connection to the source of gas is a gas pipe which is secured within a wall, the floor or the ceiling of the building. The gas pipe is usually adequately attached to the structure of the building to provide for a stable attachment enabling a leak-free connection.

The attachment to the appliance is typically achieved by attaching the flexible gas supply tube to a gas inlet fitting which is attached to and extends from the rear panel of the appliance. The gas inlet fitting is connected to the burner in the appliance by a gas tube. During the attachment of the flexible gas supply tube, it is necessary for the gas inlet fitting to be adequately secured to the appliance in order to support the required rotation of the connection fitting of the flexible gas supply tube. In addition to supporting the rotation of the supply tube fitting, the gas inlet fitting must also be secured such that any axial movement of the gas inlet fitting is also resisted. Any axial movement of the gas inlet fitting during attachment of the flexible gas supply tube or during the final positioning of the appliance has the possibility of disturbing the connection between the gas supply tube and the gas fitting, the connection between the gas inlet fitting and the burner and/or permanently distorting the gas tube which extends between these components.

The continued development of gas powered appliances includes the designing and development of gas line mounting assemblies. The gas line mounting assemblies need to be designed as a low cost device which ensures the stability of the assembly during the attachment and positioning of the appliance.

SUMMARY OF THE INVENTION

The present invention provides the art with a gas line mounting assembly which comprises a gas inlet fitting and a stamped steel mounting bracket. The mounting bracket is attached to the rear panel and the bottom panel of the appliance. The gas fitting includes a rectangular body which resists rotation. A groove in the rectangular body receives a tab which is formed from the wall of the bracket. Once the tab has been plastically deformed into the groove, axial movement of the gas inlet fitting is prohibited. Thus, a simplified, low cost highly effective gas line mounting assembly is provided for the secure attachment of the appliance to the source of gas supply. The present invention eliminates the need for welding the components together, thus eliminating both the time required to manufacture the assembly and the costs associated with the assembly.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a vertical side view, partially in cross-section, of an appliance which incorporates the unique gas line mounting assembly in accordance with the present invention;

FIG. 2 is an enlarged vertical end view of the unique gas line mounting system shown in FIG. 1;

FIG. 3 is a top plan view of the gas mounting system in accordance with the present invention;

FIG. 4 is a perspective view of the bracket for the gas mounting system in accordance with the present invention;

FIG. 5 is a side cross-sectional view of the gas inlet fitting shown in FIGS. 1–3;

FIG. 6 is a side view of the mounting bracket shown in FIGS. 1–4; and

FIG. 7 is a top plan view of the mounting bracket shown in FIGS. 1–4.

DETAILED DESCRIPTION OF THE PREFERRED EMBODIMENT

Referring now to the drawings in which like reference numerals designate like or corresponding parts throughout the several views, there is shown in FIG. 1 a gas powered appliance incorporating the unique gas line mounting assembly in accordance with the present invention and which is designated generally by the reference number 10. Appliance 10 comprises the gas powered device 12, cabinet 14 and gas line mounting system 16. Gas powered device 12 can be a gas dryer, a gas range or any other type of gas powered device.

Cabinet 14 includes a pair of side panels 20, a front panel (not shown), a rear panel 24 (first panel), a top panel (not shown), a bottom panel 28 and a control console (not shown). These panels are attached to each other by bolts, screws, welding or by other means known in the art to enclose device 12 to provide an aesthetically pleasing appearance for appliance 10. The control console is typically located on the top of appliance 10 and it includes the various controls required to operate appliance 10.

Gas line mounting system 16 comprises a gas inlet fitting 40 and a mounting bracket 42. Gas inlet fitting 40 comprises a generally rectangular body 44 having a generally located bore 46 extending from one end to the opposite end axially through fitting 40. An inlet end of fitting 40 includes an eternally threaded diameter 48 for attachment to a connection hose or tube. The opposite or outlet end of fitting 40 includes an internal diameter 50 for attachment to a connecting pipe 52 which attaches fitting 40 to a burner 54 of device 12. The attachment of connecting pipe 52 to fitting 40 is preferably accomplished as detailed in Assignee's U.S. Pat. Nos. 5,833,280 and 5,964,023, the disclosures of each patent being incorporated herein by reference. While the inlet end of fitting 40 is shown as an external threaded diameter 48, it is within the scope of the present invention to use an internal threaded diameter or any other type of connection known in the art. Also, while the outlet end of fitting 40 is shown as having internal diameter 50, it is within the scope of the present invention to use an internal or an external threaded diameter or any other type of connection known in the art. A groove 56 extends circumferentially around body 44 at a position between diameters 48 and 50.

Bracket 42 comprises a generally horizontal portion 60 adapted to be attached to bottom panel 28, a generally vertical portion 62 adapted to be attached to rear panel 24 and an angular portion 64 extending between portion 60 and 62.

Horizontal portion 60 defines a pair of circular holes 66 which are utilized to secure bracket 42 to bottom panel 28 using a pair of screws 68 or by other means known in the art. Generally vertical portion 62 also includes a pair of circular holes 70 utilized to secure bracket 42 to rear panel 24 using a pair of screws 72. A pair of flanges 74 are located on opposite sides of vertical portion 62 to provide stiffness to bracket 42. Generally vertical portion 62 also defines a generally rectangular aperture 76 adapted to slidingly receive rectangular body 44 of gas inlet fitting 40.

Angular portion 64 defines a generally rectangular aperture 78 adapted to slidingly receive rectangular body 44 of gas inlet fitting 40. Aperture 78 is in registry with aperture 76 in vertical portion 62 and rectangular body 44 extends through both apertures 76 and 78 as shown in FIGS. 1–3. The rectangular shape of apertures 76, 78 and body 44 prevent rotation of fitting 40 with respect to bracket 42. A retention tab 80 extends from angular portion 64 into aperture 78. Tab 80 includes a plastically deformed portion 82 which extends into groove 56 to axially position fitting 40 within bracket 42 and prevent longitudinal movement of fitting 40 with respect to bracket 42.

While not listed in any particular order, the assembly for gas line mounting system 16 comprises machining gas inlet fitting 40 from steel, brass or other material to form bore 46, threaded diameter 48, diameter 50 and groove 56. Connecting pipe 52 is assembled into bore 50 of fitting 40 with the opposite end of connecting pipe 52 being provided with the appropriate connector, typically a brass fitting, for mating with burner 54. Bracket 42 is formed from a flat sheet of material by stamping holes 66, holes 70, aperture 76, aperture 78 and tab 80. Bracket 42 is bent to form horizontal portion 60, vertical portion 62 and angular portion 64. When bracket 42 is bent to form portions 60 through 64, tab 80 is bent to a position where fitting 40 can be slidingly inserted into apertures 76 and 78. Fitting 40 is slid into apertures 76 and 78 and positioned axially such that groove 56 is positioned below tab 80. Tab 80 is plastically deformed to create deformed portion 82 which extends into groove 56 to axially retain fitting 40 in apertures 76 and 78.

Gas line mounting system 16 is shipped to the manufacturer of appliance where it is attached to bottom panel 28 using screws 68 and 72. While bottom panel 28 is shown having an upstanding panel 84, it is within the scope of the present invention to have rear panel 24 extend beyond mounting system 16 in place of panel 84 if desired. For this design, gas line mounting system 16 would be attached to rear panel 24. Panel 84 and/or rear panel 24 includes a rectangular shaped aperture 90 through which rectangular body 44 of fitting 40 is positioned. Pipe 52 is attached to the gas controller (not shown) for burner 54 and appliance 10 is ready for shipment to the consumer. Once mounting system 16 is secured to bottom panel 28 and panel 84 and/or rear panel 24 with fitting 40 extending through aperture 90, the rectangular shape of body 44 positioned within apertures 76, 78 and 90 resist the torsional loads applied to fitting 40 while the enlargement of deformed portion 82 of tab 80 positioned within groove 56 resists any axial movement of fitting 40.

Thus, gas line mounting system 16 provides a low cost secure connection for attachment of the gas supply line which resists both torsional and axial loading which occurs during attachment and positioning of the appliance 10.

While the above detailed description describes the preferred embodiment of the present invention, it should be understood that the present invention is susceptible to modification, variation and alteration without deviating from the scope and fair meaning of the subjoined claims.

What is claimed is:

1. A gas powered appliance comprising:
   a cabinet;
   a bracket secured to said cabinet, said bracket defining a contoured aperture having a continuous closed edge;
   a gas inlet fitting attached to said bracket, said fitting having a contoured body;
   means for preventing rotational movement of said fitting with respect to said bracket, said means for preventing rotational movement comprising full engagement between said contoured body and said contoured aperture; and
   means for preventing longitudinal movement of said fitting with respect to said bracket.

2. The gas powered appliance according to claim 1 wherein said contoured body of said fitting is a generally rectangular body, said contoured aperture of said bracket is a first generally rectangular aperture, said rectangular body being disposed within said generally rectangular aperture for preventing said rotational movement between said body and said aperture.

3. The gas powered appliance according to claim 2 wherein said fitting defines a groove extending into said rectangular body, said bracket defines a tab and said means for preventing longitudinal movement comprises said tab being disposed within said groove.

4. The gas powered appliance according to claim 2 wherein said bracket defines a second generally rectangular aperture, said rectangular body being disposed within said second generally rectangular aperture.

5. The gas powered appliance according to claim 4 wherein said fitting defines a groove extending into said rectangular body, said bracket defines a tab and said means for preventing longitudinal movement comprises said tab being disposed within said groove.

6. The gas powered appliance according to claim 1 wherein said fitting defines a groove extending into said contoured body, said bracket defines a tab and said means for preventing longitudinal movement comprises said tab being disposed within said groove.

7. The gas powered appliance according to claim 1 wherein said fitting defines a first threaded diameter at an inlet end and a rectangular shaped body.

8. The gas powered appliance according to claim 7 wherein said bracket defines a first rectangular aperture for slidingly receiving said fitting.

9. The gas powered appliance according to claim 8 wherein said fitting defines a groove extending into said rectangular body, said bracket defines a tab and said means for preventing longitudinal movement comprises said tab being disposed within said groove.

10. The gas powered appliance according to claim 7 wherein said bracket defines a second generally rectangular aperture, said rectangular body being disposed within said second d generally rectangular aperture.

11. The gas powered appliance according to claim 10 wherein said fitting defines a groove extending into said rectangular body, said bracket defines a tab and said means for preventing longitudinal movement comprises said tab being disposed within said groove.

12. The gas powered appliance according to claim 7 wherein said fitting defines a groove extending into said rectangular body, said bracket defines a tab and said means for preventing longitudinal movement comprises said tab being disposed within said groove.

13. The gas powered appliance according to claim 1 wherein said cabinet includes a bottom panel, said gas inlet fitting being secured to said bottom panel.

14. A gas line mounting assembly comprising:
a bracket having a first portion adapted for being secured to a cabinet, a second portion adapted for being secured to said cabinet and a third portion extending between said first and second portions, said third portion defining a contoured aperture having a continuous closed edge;
a gas inlet fitting attached to said bracket, said fitting having a contoured body;
means for preventing rotational movement of said fitting with respect to said bracket said means for preventing rotational movement comprising full engagement between said contoured body and said contoured aperture; and
means for preventing longitudinal movement of said fitting with respect to said bracket.

15. The gas powered appliance according to claim 14 wherein said contoured body of said fitting is a generally rectangular body, said contoured aperture of said bracket is a first generally rectangular aperture, said rectangular body being disposed within said generally rectangular aperture for preventing said rotational movement between said body and said aperture.

16. The gas powered appliance according to claim 15 wherein said fitting defines a groove extending into said rectangular body, said bracket defines a tab and said means for preventing longitudinal movement comprises said tab being disposed within said groove.

17. The gas powered appliance according to claim 15 wherein said bracket defines a second generally rectangular aperture, said rectangular body being disposed within said second generally rectangular aperture.

18. The gas powered appliance according to claim 17 wherein said fitting defines a groove extending into said rectangular body, said bracket defines a tab and said means for preventing longitudinal movement comprises said tab being disposed within said groove.

19. The gas powered appliance according to claim 14 wherein said fitting defines a groove extending into said contoured body, said bracket defines a tab and said means for preventing longitudinal movement comprises said tab being disposed within said groove.

20. A gas powered appliance comprising:
a cabinet;
a bracket secured to said cabinet said bracket defining a tab;
a gas inlet fitting attached to said bracket, said fitting defining a groove;
means for preventing rotational movement of said fitting with respect to said bracket; and
means for preventing longitudinal movement of said fitting with respect to said bracket said means for preventing longitudinal movement comprising said tab being disposed within said groove.

21. A gas line mounting assembly comprising:
a bracket having a first portion adapted for being secured to a cabinet, a second portion adapted for being secured to said cabinet and a third portion extending between said first and second portions, said bracket defining a tab;
a gas inlet fitting attached to said bracket, said fitting defining a groove;
means for preventing rotational movement of said fitting with respect to said bracket; and
means for preventing longitudinal movement of said fitting with respect to said bracket said means for preventing longitudinal movement comprising said tab being disposed within said groove.

* * * * *

UNITED STATES PATENT AND TRADEMARK OFFICE
CERTIFICATE OF CORRECTION

PATENT NO. : 6,454,311 B1
DATED : September 24, 2002
INVENTOR(S) : Gary E. Berry It is certified that error appears in the above-identified patent and that said Letters Patent is hereby corrected as shown below:

Column 2,
Line 66, "eternally" should be -- externally --.

Column 5,
Line 9, after "second" delete "d".

Column 6,
Lines 29 and 44, after "bracket" insert -- , --.

Signed and Sealed this

Eleventh Day of February, 2003

JAMES E. ROGAN
*Director of the United States Patent and Trademark Office*